(12) United States Patent
Danner

(10) Patent No.: US 10,336,214 B2
(45) Date of Patent: **\*Jul. 2, 2019**

(54) CHARGE TRANSFER SYSTEM

(71) Applicant: Jabil Inc., St. Petersburg, FL (US)

(72) Inventor: Jeffrey David Danner, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,941

(22) Filed: Oct. 9, 2017

(65) Prior Publication Data

US 2018/0029485 A1 Feb. 1, 2018

Related U.S. Application Data

(63) Continuation of application No. 14/562,399, filed on Dec. 5, 2014, now Pat. No. 9,783,070.

(Continued)

(51) Int. Cl.
*H02J 7/00* (2006.01)
*B60L 53/20* (2019.01)
*B60L 53/24* (2019.01)

(52) U.S. Cl.
CPC .............. *B60L 53/24* (2019.02); *B60L 53/20* (2019.02); *H02J 7/0052* (2013.01); *B60L 2220/52* (2013.01); *B60L 2220/54* (2013.01); *H02J 2007/0059* (2013.01); *Y02T 10/641* (2013.01); *Y02T 10/7005* (2013.01);
(Continued)

(58) Field of Classification Search
CPC ... Y02T 10/7072; Y02T 90/127; Y02T 90/14; Y02T 10/7077; Y02T 10/648; Y02T 90/121; Y02T 10/7225; Y02T 10/7233; B60L 11/1814; B60L 2220/54; B60L 2210/14; B60L 2210/12; B60L 2220/42; H02J 7/022; H02J 2007/0059
See application file for complete search history.

(56) References Cited

U.S. PATENT DOCUMENTS 5,099,186 A 3/1992 Rippel et al.
5,341,075 A 8/1994 Cocconi
(Continued)

FOREIGN PATENT DOCUMENTS

EP 2541755 A1 1/2013

*Primary Examiner* — Ryan Johnson
(74) *Attorney, Agent, or Firm* — Young Basile Hanlon & MacFarlane, P.C.

(57) ABSTRACT

A charge transfer system includes an on-board vehicle motor system and a plug in supply. The on-board vehicle motor system includes a first motor including a plurality of stator windings, a second motor including a plurality of stator windings, a first inverter having a plurality of switch legs, a second inverter having a plurality of switch legs, a controller, and an on-board power supply. The plug-in supply is connected between at least one switch leg of the first inverter and at least one switch leg of the second inverter. The controller modulates the switch legs of the first and second inverters such that electric current flows through at least one stator winding of the first or second motor to charge the on-board power supply. The current flow can also alternate in phase with plug-in supply polarity to produce a stable stator flux vector angle preventing motor rotation during charge transfer.

12 Claims, 10 Drawing Sheets

Related U.S. Application Data

(60) Provisional application No. 61/939,968, filed on Feb. 14, 2014.

(52) U.S. Cl.
CPC .......... *Y02T 10/7072* (2013.01); *Y02T 90/127* (2013.01); *Y02T 90/14* (2013.01)

(56) References Cited

U.S. PATENT DOCUMENTS

| | | |
|---|---|---|
| 6,630,804 B2 | 10/2003 | Moriya et al. |
| 7,449,853 B2 | 11/2008 | Korich et al. |
| 7,859,201 B2 | 12/2010 | Oyobe et al. |
| 7,891,451 B2 | 2/2011 | Oyobe et al. |
| 8,054,013 B2 | 11/2011 | Oyobe et al. |
| 8,143,861 B2 | 3/2012 | Oyobe et al. |
| 8,415,904 B2 | 4/2013 | Rippel |
| 8,432,126 B2 | 4/2013 | Hasan et al. |
| 9,783,070 B2 * | 10/2017 | Danner ............... B60L 11/1814 |
| 2009/0146612 A1 | 6/2009 | Oyobe et al. |
| 2009/0184681 A1 | 7/2009 | Kuno |
| 2010/0027305 A1 | 2/2010 | Oyobe et al. |
| 2015/0314694 A1 | 11/2015 | Alakula et al. |

\* cited by examiner

CHARGE TRANSFER SYSTEM

CROSS REFERENCE TO RELATED APPLICATION

This application is a continuation of U.S. Non-Provisional Ser. No. 14/562,399, filed Dec. 5, 2014, which claims the benefit of U.S. Provisional Application No. 61/939,968, filed Feb. 14, 2014, both of which are incorporated by reference as if fully set forth.

FIELD OF INVENTION

The present invention relates generally to a system for recharging a power storage device, and more particularly for discharging or supplying power from a power storage device mounted on a vehicle, for example.

BACKGROUND

Many plug-in hybrid electric vehicles (PHEVs) have two electric motors. One motor may typically be utilized for traction while the other is utilized for power generation. There are also other accessory electric motors in these vehicles (i.e., air conditioning compressor, and power steering pump). These motors are often three-phase permanent magnet motors, which, during operation are powered by an on-board power supply, such as a battery. As the vehicle is operated, the on-board power supply discharges and requires recharging at some point.

The PHEVs have on-board power generation capabilities using a fuel based generator to partially recharge the on-board electrical power supply as needed. However, it may be preferred to recharge the on-board power supply using an external power source when possible.

For opportunistic recharging using an external power source, it is beneficial for the vehicle to have the ability to accept power from any standard electrical outlet and Electric Vehicle Support Equipment (EVSE) and possibly a DC source. Electronics associated with such opportunistic recharging may undesirably add cost and/or weight to the vehicle. Since it may not be practical to plug-in charge and drive the vehicle at the same time, dual purposing the drive magnetics and power electronics and/or the accessory motor systems as part of the battery charger may be utilized.

For example, the battery charger may be integrated into a dual three-phase motor drive train with star connected motor windings by connecting a plug-in power supply to the neutral node of each three-phase motor.

With the neutral node connected configuration, equal currents can be made to flow through the motor windings to avoid creating motor torque. When equal currents are caused to flow through three-phase windings of the motor, however, what can be utilized is only the leakage inductance of the windings. Therefore, there may be problems that the commercial power supply cannot sufficiently be boosted to the battery voltage, or influence of ripple to the input side increases.

Further, when single-phase or dual-phase motor windings are selected and a current is caused to flow therein to utilize the higher magnetic inductance, the motor generates torque which could cause the vehicle to move or oscillate during charging especially as the stator winding current changes direction each AC half line cycle.

Further, these neutral node connected integrated charging systems tend to induce a high common-mode noise, electromagnetic interference (EMI), and unwanted ground currents.

SUMMARY

An integrated bi-directional charge transfer system is disclosed. The integrated bi-directional charge transfer system includes a vehicle motor system and a plug-in supply. The vehicle motor system includes a first motor including a plurality of stator windings, a second motor including a plurality of stator windings, a first inverter including a plurality of switch legs, a second inverter including a plurality of switch legs, a controller, and an on-board power supply. The plug-in supply is connected to a selected switch leg of the first inverter and a selected switch leg of the second inverter. The controller is configured to control the plurality of switch legs of the first and second inverters such that electric current flows from the plug-in supply through the first motor or the second motor to charge the on-board power supply. The current flow can be made to alternate between the first and second motors in phase with an plug-in supply that has alternating polarity for reducing common mode noise and for preventing motor rotation during charge transfer.

BRIEF DESCRIPTION OF THE DRAWING(S)

A more detailed understanding may be had from the following description, given by way of example in conjunction with the accompanying drawings wherein.

DETAILED DESCRIPTION OF THE PREFERRED EMBODIMENT(S)

Figure 1:
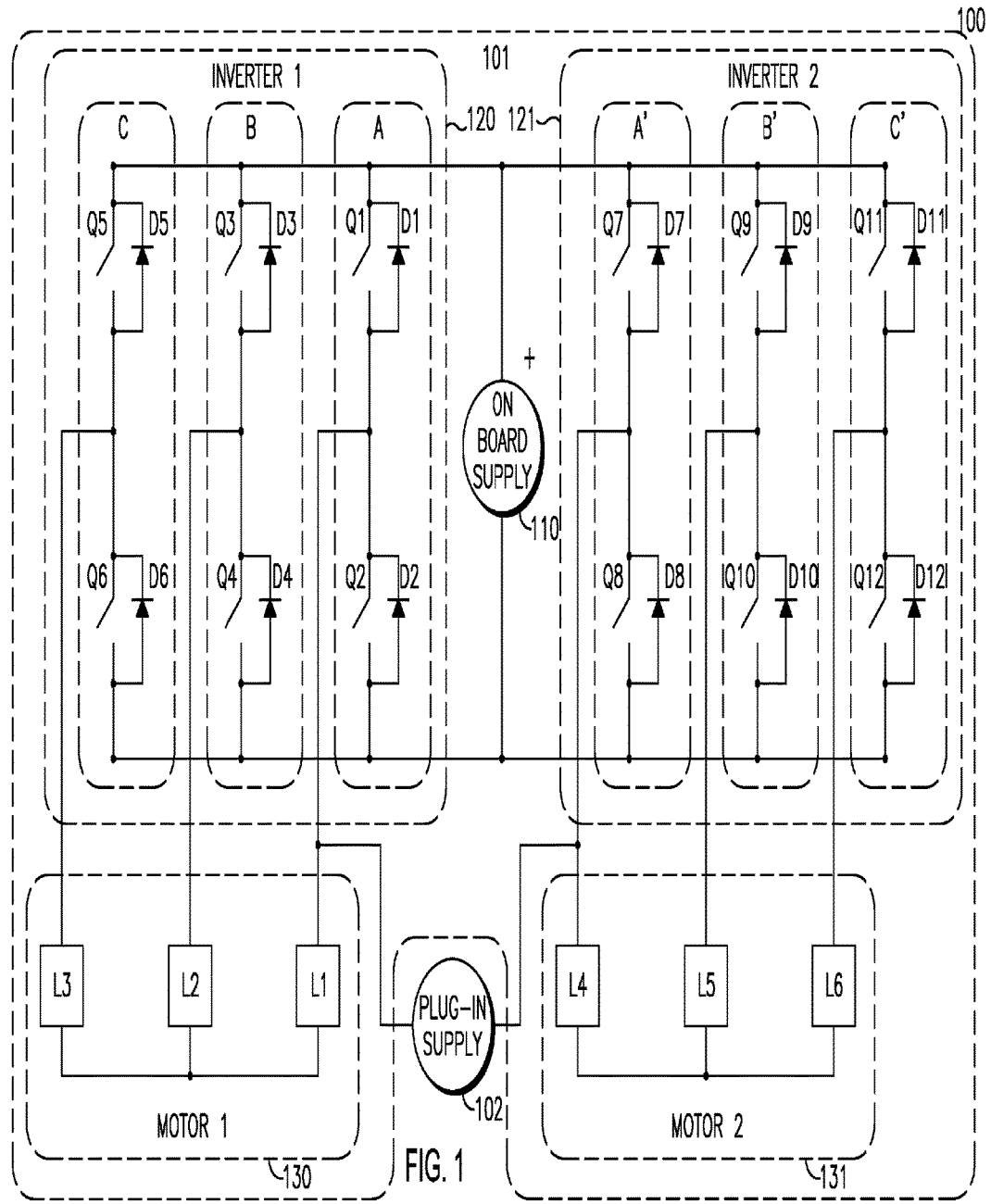
FIG. 1 is an example top-level diagram of a vehicle charging system in accordance with an embodiment.

It is to be understood that the figures and descriptions of embodiments of a charge transfer system have been simplified to illustrate elements that are relevant for a clear understanding, while eliminating, for the purpose of clarity, many other elements found in typical vehicle systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The non-limiting embodiments described herein are with respect to a charge transfer system. The charge transfer system may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the charge transfer system including, for example but not limited to, an integrated bi-directional charge transfer system although it may be described with respect to a particular embodiment.

Referring now to the drawings wherein similar reference numerals refer to similar elements across the several views, a charge transfer system is described. The embodiments described herein provide an on-board charging solution for an electric or hybrid electric vehicle by integrating with the on-board drive magnetics and power electronics.

In general and as further described herein below, embodiments of the present invention connect the plug-in supply to at least one switch leg of both inverters. Such a configuration can be used to perform several types of bridgeless power factor correction (PFC) boost/buck conversions within the dual inverter/motor drive system to charge and discharge the vehicle power supply. One of these bridgeless PFC boost/buck conversions creates two distinct and complementary boost/buck converter circuits. Each PFC boost/buck converter circuit utilizing a single motor's windings as its inductive element. Full wave rectification is accomplished by alternating between the two boost/buck circuits each AC half power line cycle. This configuration along with PFC modulation benefits from increased boost inductance, stable zero torque angle within each motor, and reduced noise levels.

FIG. 1 is a top level diagram of a vehicle charging system 100 in accordance with an embodiment. The vehicle charging system 100 includes an on-board vehicle motor system 101 and a plug-in power supply 102.

On-board vehicle motor system 101 includes an on-board power supply 110, a first inverter 120 and a second inverter 121, a first permanent magnetic motor 130 and a second permanent magnetic motor 131. The first inverter 120 includes a plurality of switch legs A, B, C. Each of the plurality of switch legs A, B, C includes a pair of switching elements Q1/Q2, Q3/Q4, and Q5/Q6 respectively. Each switching element Q1, Q2, Q3, Q4, Q5, and Q6 includes an associated paralleling diode D1, D2, D3, D4, D5, and D6 respectively for clamping voltage transients experienced when switching inductive loads. Similarly, the second inverter 121 includes a plurality of switch legs A', B', C'. Each of the plurality of switch legs A', B', C' includes a pair of switching elements Q7/Q8, Q9/Q10, and Q11/Q12 respectively. Each switching element Q7, Q8, Q9, Q10, Q11, and Q12 includes an associated paralleling diode D7, D8, D9, D10, D11, and D12 respectively for clamping voltage transients experienced when switching inductive loads. The first motor 130 includes a plurality of stator windings L1, L2, L3 connected to the plurality of switch legs A, B, C of the first inverter 120. The second motor 131 includes a plurality of stator windings L4, L5, L6 connected to the plurality of switch legs A', B', C' of the second inverter 121. The plug-in power supply 102 is connected between switch legs A and A' of inverters 120 and 121, respectively. Alternatively, the plug-in power supply 102 may be connected between one or more of the switch legs A, B and C of inverter 120 and one or more of the switch legs A', B' and C', of inverter 121.

In the examples described herein, the plurality of switching elements Q1-Q12 can represent either insulated-gate bipolar transistor (IGBT) or metal-oxide-semiconductor field-effect transistor (MOSFET) devices, by way of non-limiting example only. In an embodiment, with the bi-directional aspect of MOSFET devices one could turn any of the corresponding switching elements to "ON" for each switch where the paralleling diode is conducting to further reduce conduction losses.

Figure 2:
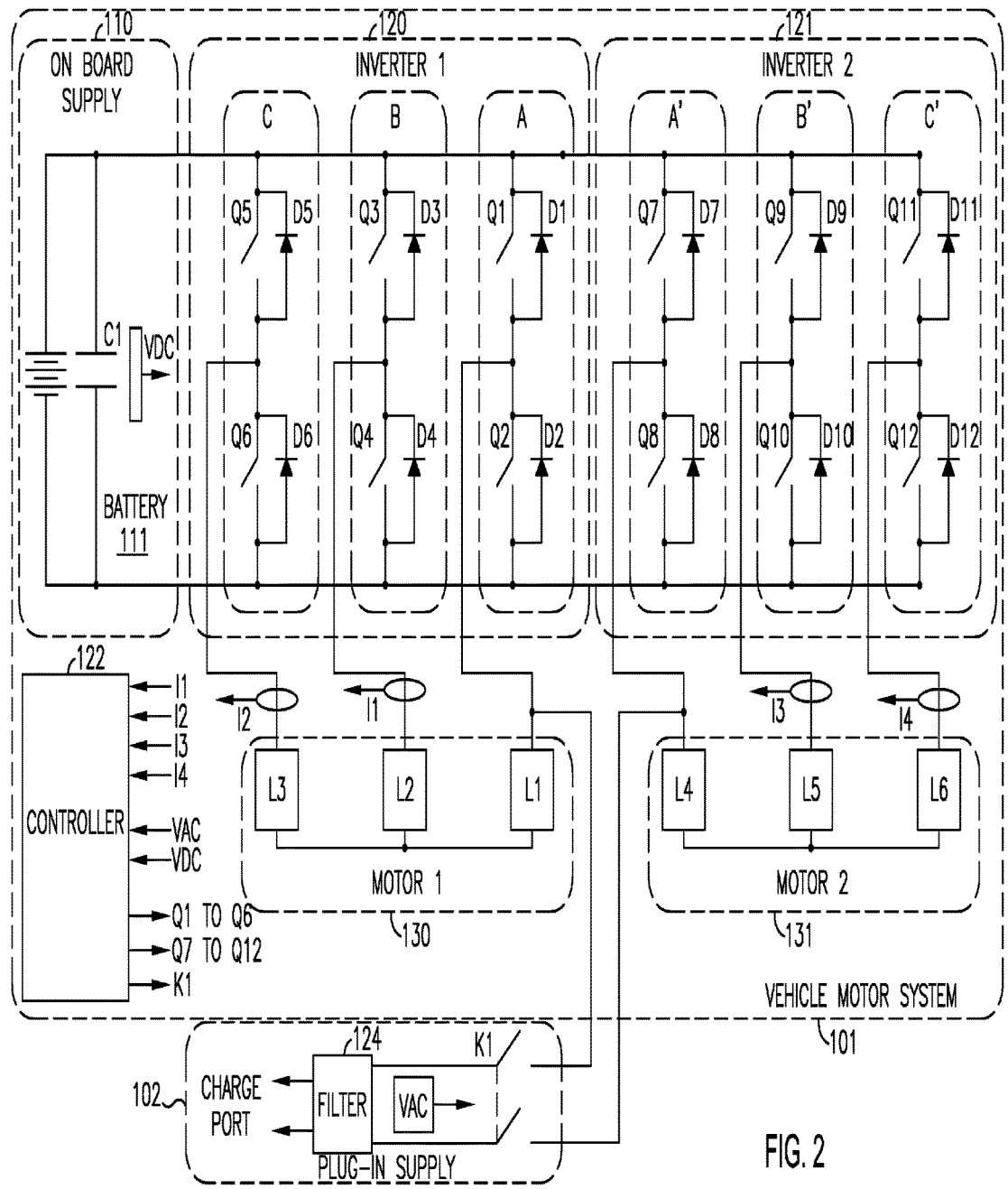
FIG. 2 is a more detailed diagram of the vehicle charging system of FIG. 1.

Referring now to FIG. 2, there is shown a more detailed diagram of an embodiment of the vehicle charging system 100 of FIG. 1. On-board vehicle motor system 101 includes an on-board supply 110, a first inverter 120 and a second inverter 121, a controller 122, a first motor 130 and a second motor 131. The on-board supply 110 may include a battery 111 and capacitor C1. As will be understood by one of ordinary skill in the art, capacitor C1 may be used for absorbing and supplying high frequency currents during pulsed switching. The plug-in supply 102 includes a filter 124 and a switch K1 for completing a circuit between the plug-in supply 102 and the on-board vehicle motor system 101.

As described above, the first inverter 120 includes a plurality of switch legs A, B, C. Each of the plurality of switch legs A, B, C includes a pair of switching elements Q1/Q2, Q3/Q4, and Q5/Q6 respectively. Each switching element Q1, Q2, Q3, Q4, Q5, and Q6 includes an associated paralleling diode D1, D2, D3, D4, D5, and D6 respectively for clamping voltage transients experienced when switching inductive loads. Similarly, the second inverter 121 includes a plurality of switch legs A', B', C'. Each of the plurality of switch legs A', B', C' includes a pair of switching elements Q7/Q8, Q9/Q10, and Q11/Q12 respectively. Each switching element Q7, Q8, Q9, Q10, Q11, and Q12 includes an associated paralleling diode D7, D8, D9, D10, D11, and D12 respectively for clamping voltage transients experienced when switching inductive loads. The first motor 130 includes a plurality of stator windings L1, L2, L3 connected to the plurality of switch legs A, B, C of the first inverter 120. The second motor 131 includes a plurality of stator windings L4, L5, L6 connected to the plurality of switch legs A', B', C' of the second inverter 121.

The controller 122 includes current inputs I1, I2, I3, I4 and a voltage input Vdc corresponding to the associated induced currents and respective voltage Vdc in the on-board vehicle motor system 101. The controller 122 also includes a second voltage input, Vac, which corresponds to the Vac output from the plug-in supply 102. The controller 122 also includes a plurality of outputs O1-O6, and O7-O12 for switches Q1-Q6, and Q7-Q12, respectively and output 125 for K1, for controlling the closing and opening of those respective switches. Accordingly, the controller 122 may include software, firmware or the like to perform the operations allocated to it.

The plug-in power supply 102 is connected to switch legs A and A' of inverters 120 and 121, respectively, and the filter 124, which may be an electromagnetic interference (EMI) filter, which in turn may be connected to an external charge port, (e.g., standard electrical outlet or standard EVSE, DC source, or load). Alternatively, the plug-in power supply 102 may be connected between one or more of the switch legs A, B and C of inverter 120 and one or more of the switch legs A', B' and C', of inverter 121.

Referring now to FIGS. 3A-3D, there is shown an example of an on-board vehicle power supply charging operation in accordance with the invention. The operations shown in FIGS. 3A-3D is a boost modulation that alternates between motors 130 and 131 to maintain a sufficiently stable stator flux vector angle in each motor. Alternation between motors 130 and 131 depends on the polarity of the AC line voltage of the plug-in supply 102. The boost modulation may be performed such that the instantaneous plug-in supply current is proportional to the plug-in supply voltage to achieve a unity power factor, (i.e., PF=1). Unity power factor may be achieved using power factor correction (PFC).

Figure 3A:
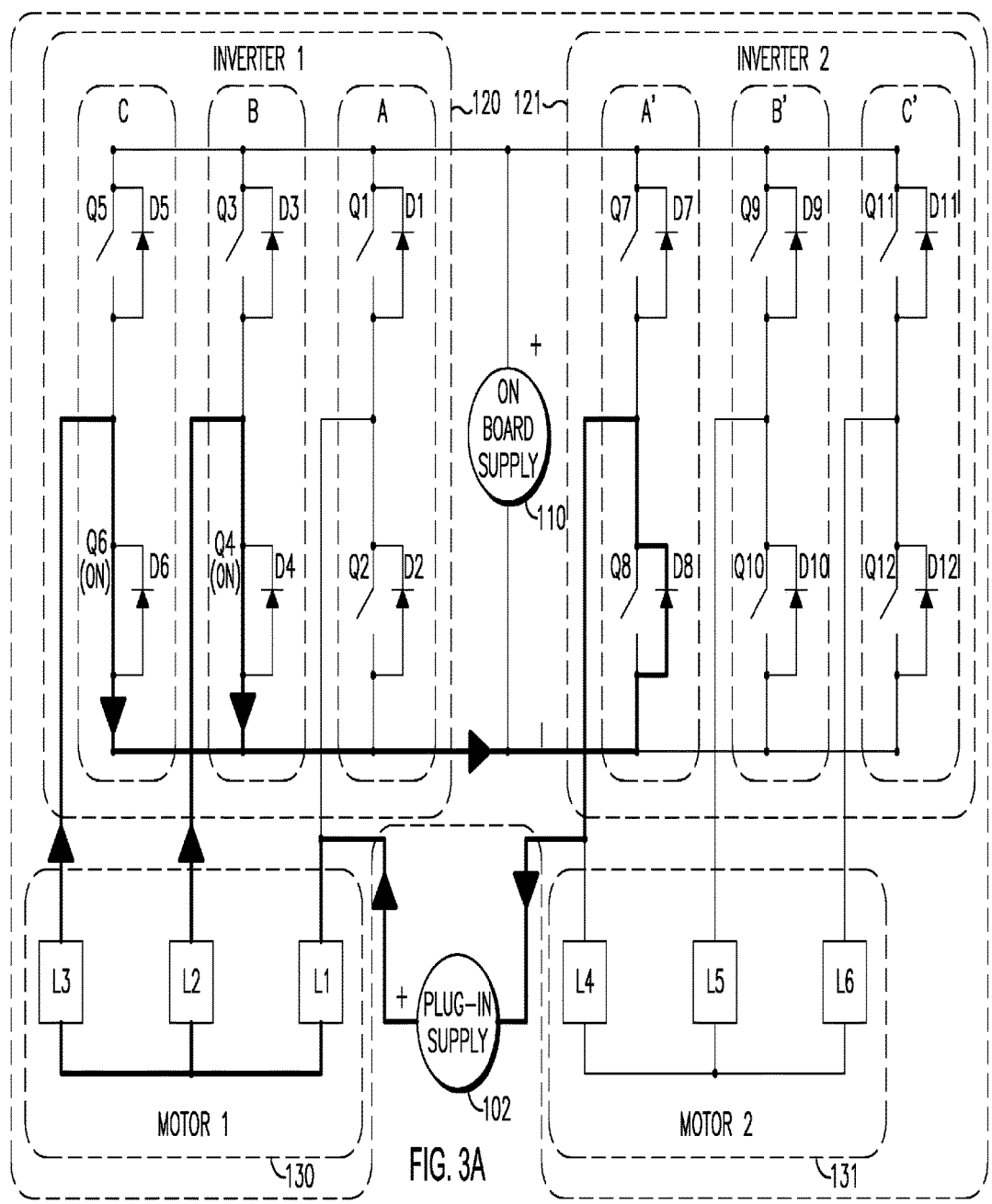
FIG. 3A shows an example first switch state of an on-board vehicle power supply charging operation when the plug-in supply is positive in accordance with an embodiment.
Figure 3B:
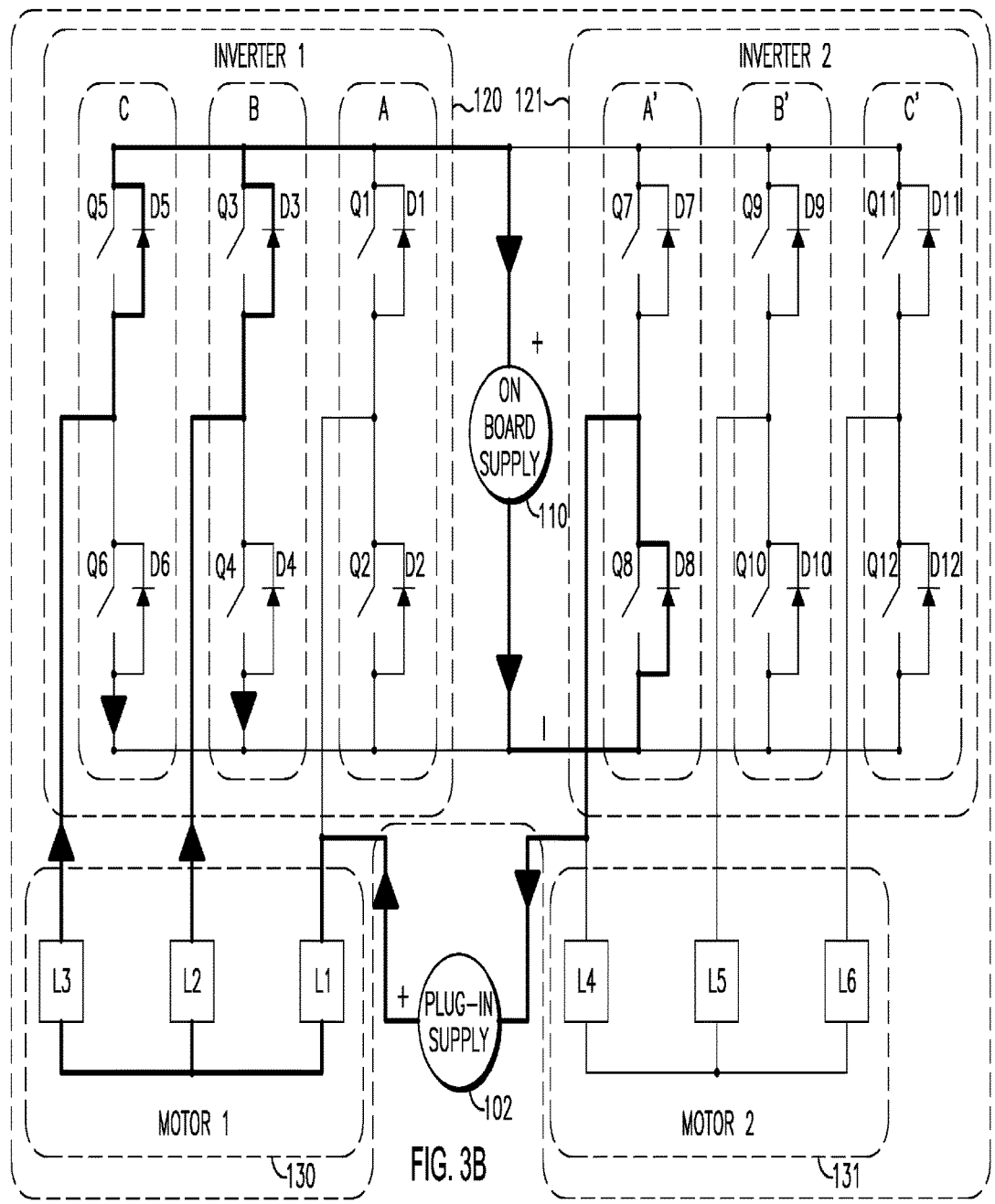
FIG. 3B shows an example second switch state of an on-board vehicle power supply charging operation when the plug-in supply is positive in accordance with an embodiment.
Figure 3C:
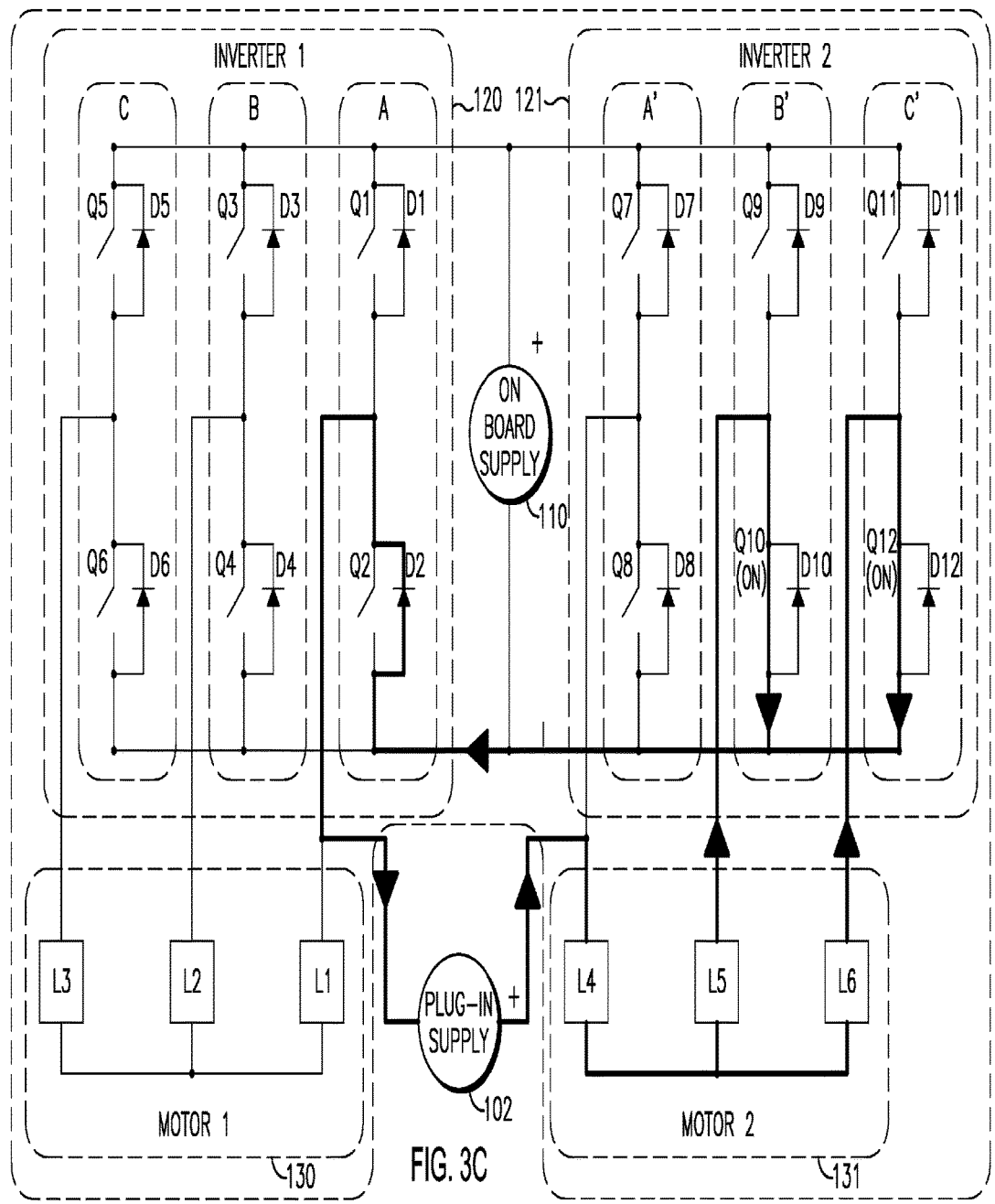
FIG. 3C shows an example first switch state of an on-board vehicle power supply charging operation when the plug-in supply is negative in accordance with an embodiment.
Figure 3D:
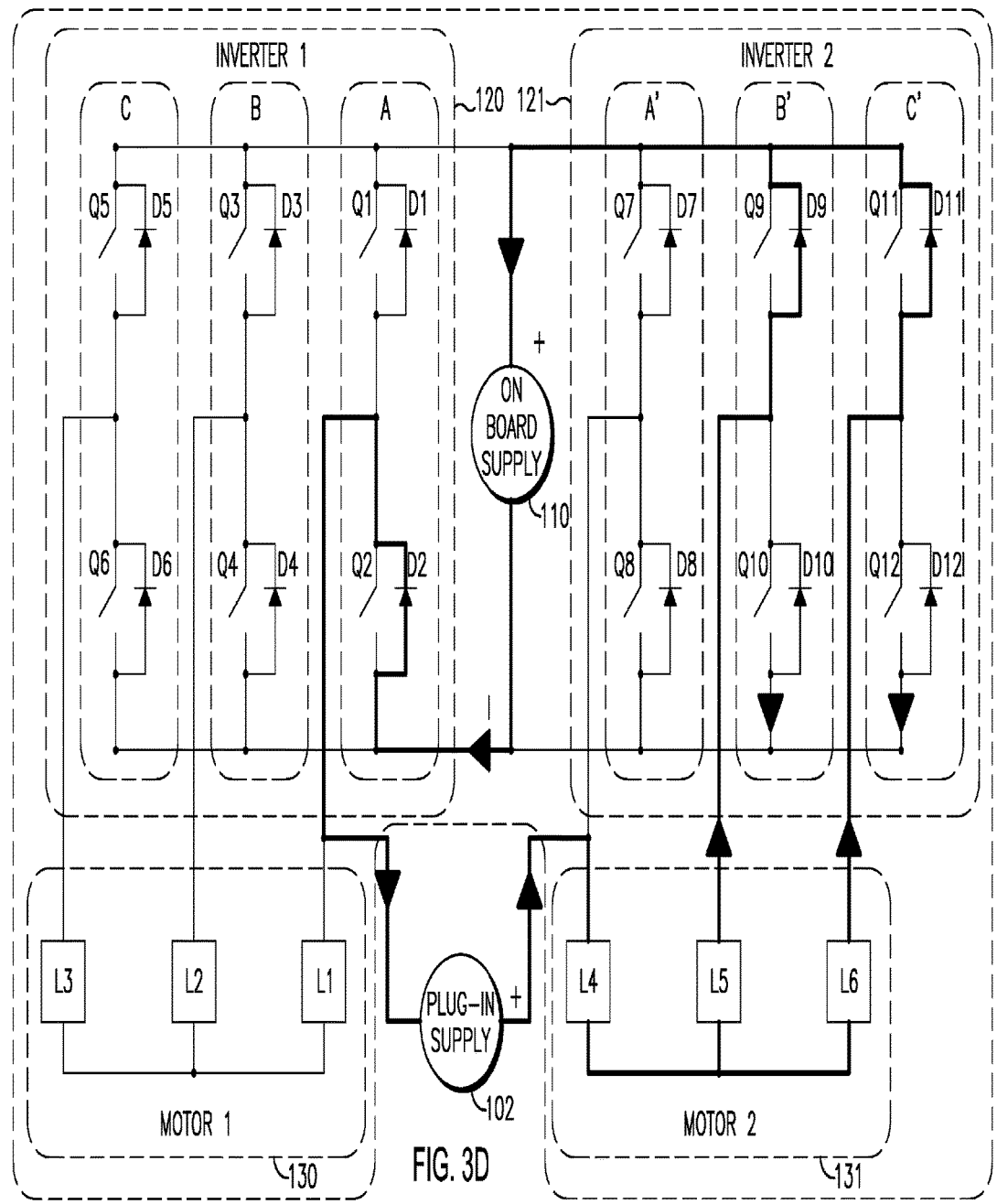
FIG. 3D shows an example second switch state of an on-board vehicle power supply charging operation when the plug-in supply is negative in accordance with an embodiment.

FIGS. 3A-3B show a high frequency (e.g., 10-20 kilohertz (kHz) modulated first and second switch states when the AC line voltage polarity of the plug-in power supply 102 is positive, (i.e., during a positive half line cycle). FIGS. 3C-3D show a high frequency (e.g., 10-20 kilohertz (kHz)) modulated first and second switch states when the AC line voltage polarity of the plug-in power supply 102 is negative, (i.e., during a negative half line cycle). The duty cycle ratio between the respective first and second switch states is such that a unity power factor is achieved.

Depending on the polarity of the AC line voltage of the plug-in power supply 102, either the first inverter 120 or the second inverter 121 is in a non-switching state, (referred herein as the "non-switching state inverter"), while the remaining one of the first inverter 120 or the second inverter 121 is modulating the switch legs not directly connected to the plug-in supply, (which is for purposes of illustration only shown as switch legs B, C, B' and C' in FIG. 2), to keep the line current in phase with the line voltage to maintain a unity power factor load condition (PF=1). The non-switching state inverter provides a low frequency reference, (which is instrumental in reducing noise levels), between the on-board supply 110 and the plug-in supply 102 through a low side paralleling diode of the plug-in connected switch leg (switch leg A or switch leg A') during each AC half line cycle (i.e., either a positive or negative half line cycle), where an AC line cycle may be 60 Hz, by way of non-limiting example. The frequency of the AC line cycle may be any applicable value for any applicable region.

At zero line power crossings, (i.e., when the polarity of the AC line voltage goes from positive to negative polarity and vice-versa), the non-switching state inverter flips from non-switching state mode to PFC boost modulation or vice versa and then back again alternating with the AC line voltage polarity. In some examples, interleaving or distributing the pulsed switching of the switch legs not connected to the plug-in power supply 102 (switch legs B and C or B' and C') can also be used to reduce line ripple and for limited adjustment of the zero torque rotor angle position for first and second motors 130 and 131. Additionally the switch leg modulation frequency (e.g., 10-20 kHz) may be adjusted based on the terminal inductance of the motors 130 and 131 to minimize line distortion, including but not limited to line ripple, in the plug-in power supply 102

FIGS. 3A and 3B depict the high frequency (e.g., 10-20 kilohertz (kHz)) modulated first and second switch states, when the AC line voltage polarity of the plug-in power supply 102 is positive. That is, FIGS. 3A and 3B depict a positive plug-in polarity boost modulation. FIG. 3A depicts the first positive switch state. During the first positive switch state, controller 122 generates and transmits control signals through outputs O4 and O6 to switches Q4 and Q6 of the first inverter 120, causing switches Q4 and Q6 to close and current I to flow into motor 130 thereby charging the inductance of stator windings L1, L2 and L3 of motor 130 as shown. Diode D8 operates to allow current I to flow accordingly.

FIG. 3B depicts the second positive switch state. During the second positive switch state, controller 122 generates and transmits control signals through outputs O4 and O6 to switches Q4 and Q6 of the first inverter 120, causing switches Q4 and Q6 to open, thereby allowing the charged inductance of stator windings L1, L2 and L3 to discharge and allow the current I to flow from the plug-in supply 102 to the on-board supply 110, thereby resulting in the charging of the on-board supply 110 for the positive plug-in polarity boost modulation. Diodes D3, D5, and D8 operate to allow current I to flow accordingly.

FIGS. 3C and 3D depict the high frequency modulated first and second negative switch states. That is, FIGS. 3C and 3D depict a negative plug-in polarity boost modulation. FIG. 3C depicts the first negative switch state. During the first negative switch state, controller 122 generates and transmits control signals through outputs O10 and O12 to switches Q10 and Q12 of the second inverter 121, causing switches Q10 and Q12 to close and current I to flow into motor 131 thereby charging the inductance of stator windings L4, L5 and L6 of motor 131 as shown. Diode D2 operates to allow current I to flow accordingly.

FIG. 3D depicts the second negative switch state. During the second negative switch state, controller 122 generates and transmits control signals through outputs O10 and O12 to switches Q10 and Q12 of the second inverter 121, causing switches Q10 and Q12 to open, thereby allowing the charged inductance of stator windings L4, L5 and L6 to discharge and allow the current I to flow from the plug-in supply 102 to the on-board supply 110, thereby resulting in the charging of the on-board supply 110 for the negative plug-in polarity boost modulation. Diodes D2, D9, and D11 operate to allow current I to flow accordingly.

Accordingly, during the positive plug-in polarity boost modulation, charging of the on-board supply 110 occurs through motor 130, while during the negative plug-in polarity boost modulation, charging occurs through motor 131. Charging, then, alternates between motors 130 and 131. The magnetizing current I is unidirectional within each motor 130 and motor 131, respectively, which may result in a stationary zero torque rotor angle.

Figure 4A:
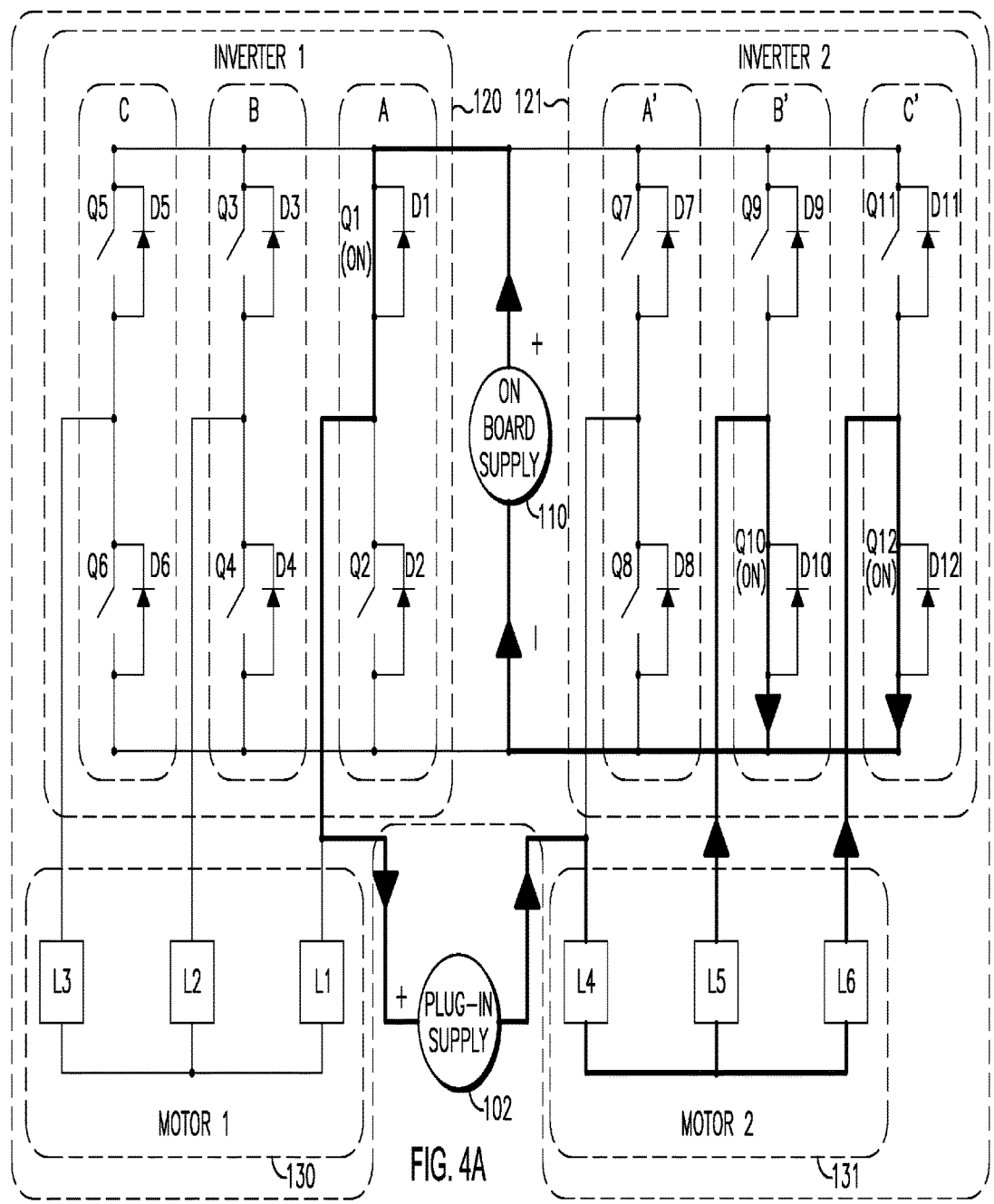
FIG. 4A shows an example first switch state of an on-board vehicle power supply discharging operation when the plug-in supply is positive in accordance with an alternative embodiment.
Figure 4B:
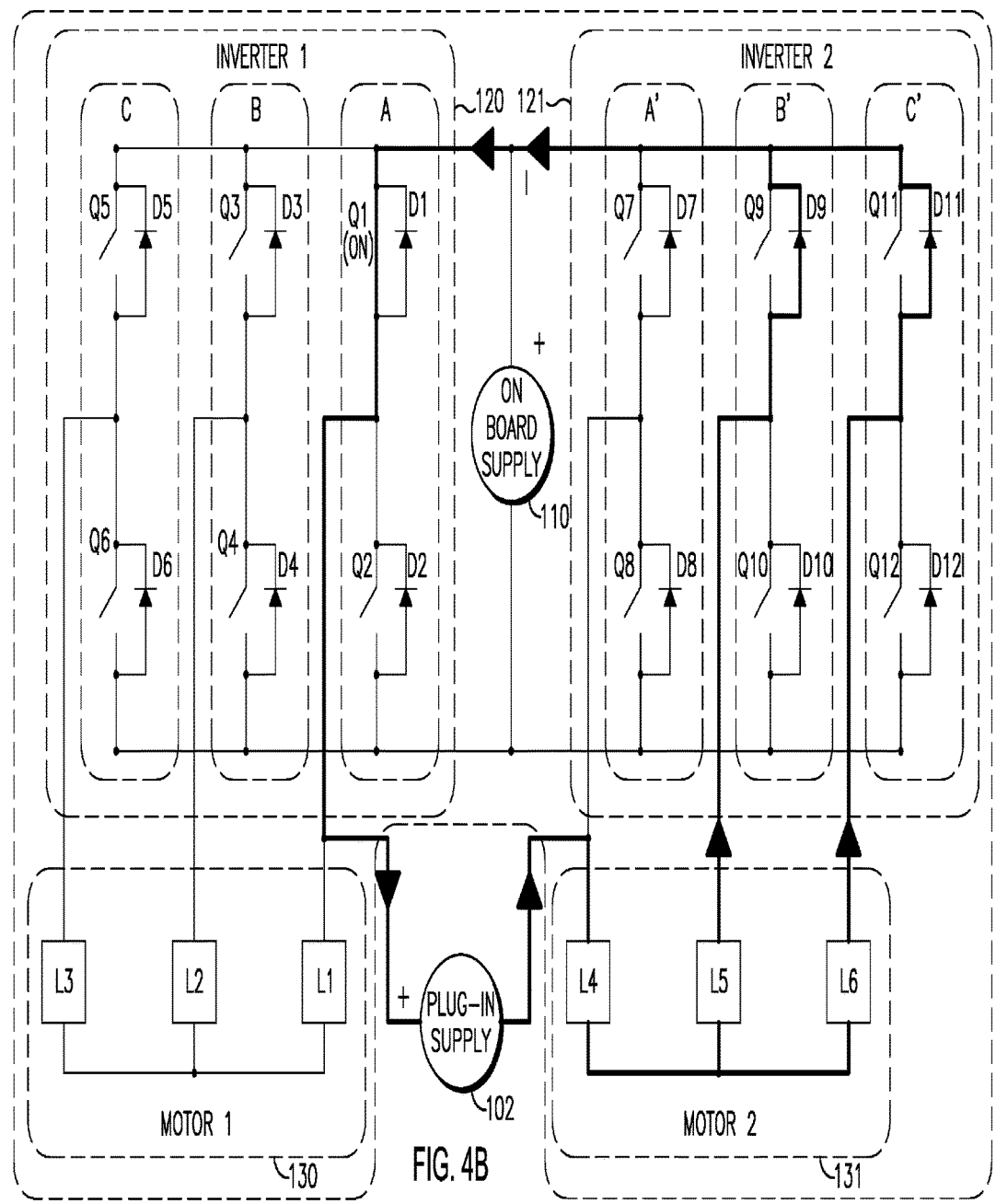
FIG. 4B shows an example second switch state of an on-board vehicle power supply discharging operation when the plug-in supply is positive in accordance with an alternative embodiment.
Figure 4C:
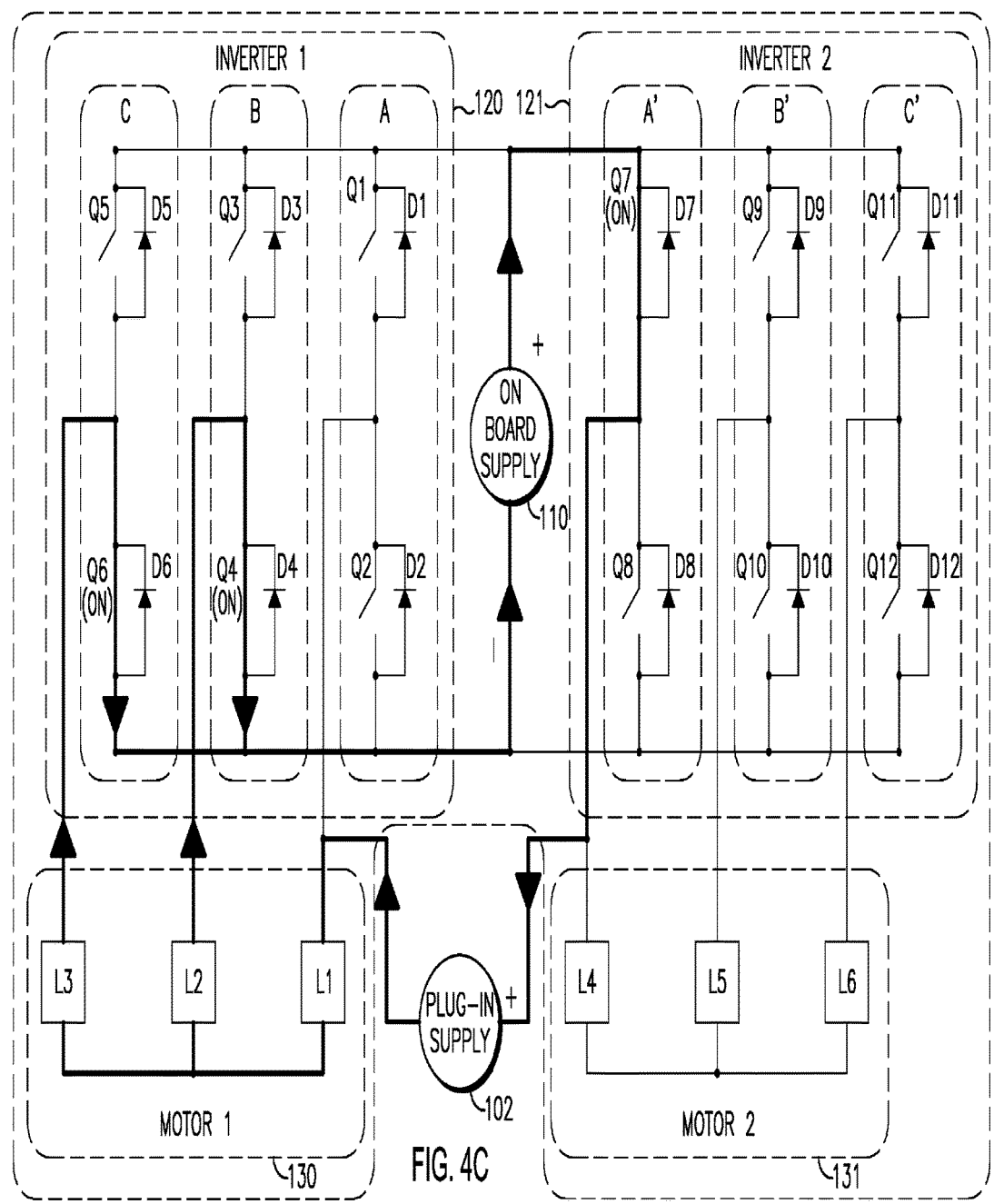
FIG. 4C shows an example first switch state of an on-board vehicle power supply discharging operation when the plug-in supply is negative in accordance with an alternative embodiment.
Figure 4D:
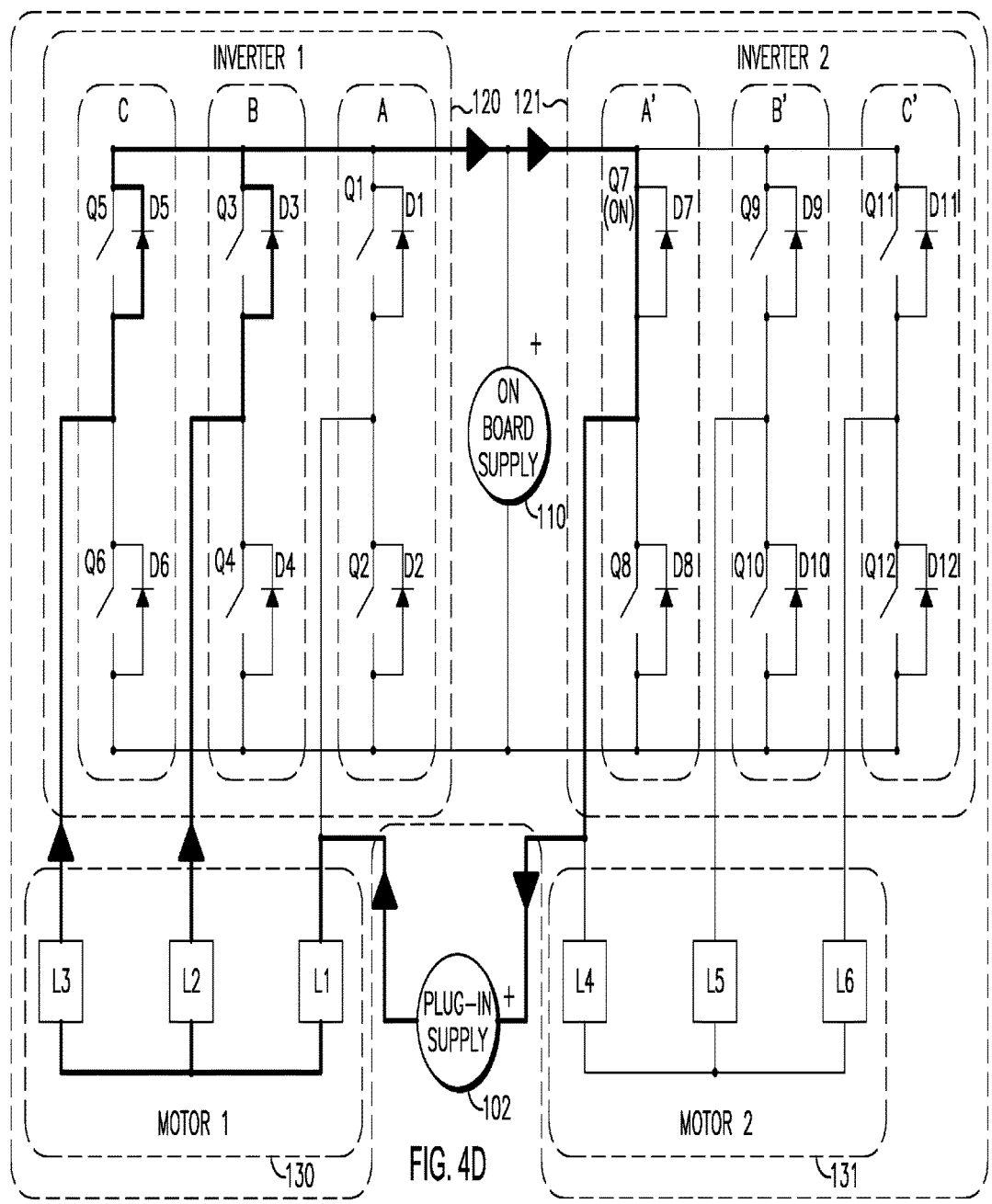
FIG. 4D shows an example second switch state of an on-board vehicle power supply discharging operation when the plug-in supply is negative in accordance with an alternative embodiment.

Referring now to FIGS. 4A-4D, there is shown an example of an on-board vehicle power supply discharging operation in accordance with the invention. That is, the operations shown in FIGS. 4A-4D are a PFC buck modulation that alternates between motor 130 and motor 131. FIGS. 4A and 4B depict a positive plug-in polarity buck modulation and FIGS. 4C and 4D depict a negative plug-in polarity buck modulation.

FIG. 4A depicts a first positive switch state for positive plug-in polarity buck modulation. During the first positive switch state, controller 122 generates and transmits control signals through outputs O1, O10 and O12 to switches Q1 of first inverter 120, and switches Q10 and Q12 of the second inverter 121, respectively, causing the switches Q1 of first inverter 121, and switches Q10 and Q12 of the second inverter 121 to close, and current I to flow from the on-board supply 110 out through the plug-in supply 102, and into motor 131, thereby charging the inductance of stator windings L4, L5 and L6 of motor 131 as shown.

FIG. 4B depicts a second positive switch state for the positive plug-in polarity buck modulation. During the second positive switch state, controller 122 generates and transmits control signals through outputs O1, O10 and O12 to switches Q1 of first inverter 120, and switches Q10 and Q12 of the second inverter 121, respectively, causing the switches Q1 of first inverter 120 to remain closed and switches Q10 and Q12 of the second inverter 121 to open, thereby allowing the charged inductance of stator windings L4, L5 and L6 to discharge thus allowing the current I to continue flowing to the plug-in supply 102 to a charge port, (which for example, is shown in FIG. 2), resulting in power being supplied out through the plug-in supply 102 for the positive plug-in polarity buck modulation. Diodes D9 and D11 operate to allow current I to flow accordingly.

FIG. 4C depicts a first negative switch state for the negative plug-in polarity buck modulation. During the first negative switch state, controller 122 generates and transmits control signals through outputs O4 and O6 and O7 to switches Q4 and Q6 of inverter 120 and switch Q7 of inverter 121, respectively, causing switches Q4 and Q6 of inverter 120 and switch Q7 of inverter 111 to close, thereby causing current I to flow from the on-board supply 110 out through the plug-in supply 102, and into motor 130, thereby charging the inductance of stator windings L1, L2, and L3 of motor 130 as shown.

FIG. 4D depicts a second negative switch state for the negative plug-in polarity buck modulation. During the second negative switch state, controller 122 generates and transmits control signals through outputs O4, O6 and O7 to switches Q4 and Q6 of inverter 120 and switch Q7 of inverter 121, respectively, causing switches Q4 and Q6 of inverter 120 to open and switch Q7 of inverter 121 to remain closed, thereby allowing charged inductance of stator windings L1, L2 and L3 to discharge thus allowing the current I to continue flowing to the plug-in supply 102 to a charge port, (which for example, is shown in FIG. 2), resulting in power being supplied out through the plug-in power supply 102 for the negative plug-in polarity buck modulation. Diodes D3 and D5 operate to allow current I to flow accordingly.

Accordingly, during the positive plug-in polarity buck modulation, output to the plug-in supply 102 occurs through motor 131, while during the negative plug-in polarity buck modulation, output occurs through motor 130. Again, the magnetizing current I is unidirectional within each motor 130 and 131, which may result in a stable zero torque rotor angle. The low frequency reference, (which is instrumental in reducing noise levels), between the on-board supply 110 and the plug-in supply 102 is made through the high side switch Q1 or Q7 of the plug-in power supply 102 connected switch leg A or A' during this discharging operation. Similar to the charging operation as shown for example in FIGS. 3A-3D, the plug-in power supply current is made to be proportional to plug-in power supply voltage yet the difference being the plug-in supply current is in the opposite direction relative to the plug-in voltage polarity.

In both the charging or boost, (FIGS. 3A-3D), and discharging or buck, (FIGS. 4A-4D), embodiments, the current through the on-board supply 110 is pulsed on/off at high frequency and the current through the plug-in power supply 102 is relatively continuous, being smoothed out by the inductance of the stator windings.

The above embodiments may accommodate the range of standard electric supply outlets including special purposed EVSE level 2 plug-in supplies, (e.g., 240V, 60 A, 14.4 kW by way of non-limiting example). By connecting the two wire single phase power supply between a switch leg of the two inverters rather than the neutral node of the two motor windings as is conventionally done, an inherent low frequency path between the external power source and the high voltage on board battery may be created that results in a reduction of unwanted common mode noise when using the alternating boost and/or buck modulation schemes described above. This low frequency reference between supplies may reduce the capacitive coupled currents in the earth ground and improve plug in safety.

In this example, a significantly higher boost inductance path may be created by incorporating the magnetizing inductance of a motor, such as motors 130 or 131, in addition to the stator leakage inductance. This higher inductance may reduce line ripple and harmonic distortion seen at the plug-in supply input.

Furthermore, the resulting flux vector created in each motor, for example motors 130 and 131, is unidirectional, and since the magnetizing flux does not change angles, there is no rotor oscillation during charging. However, the rotor may develop torque persuading it to align with the zero torque flux angle position if not already in angular alignment. Once in alignment, the result is effectively an electric brake like behavior on the rotor shaft thus preventing vehicle movement. Furthermore, since the current only flows through each motor, for example, motor 130 and 131, half of the total time the associated heat is distributed between them, this may result in higher total power capability of the system.

In the examples described above, the on-board supply 110, (e.g., battery 111), voltage may need to be higher than the peak plug-in supply voltage to avoid unregulated current flow. Accordingly, an intermediate DC to DC converter between the battery 111 and inverter bus to satisfy this voltage constraint and also to smooth out the battery current during charging may be utilized.

The embodiments described above may be applied to either AC induction and/or permanent magnet motors and/or switched reluctance motors, for example. The motor windings may also be a variety of configurations including star connected, delta connected, split-phase, or open ended.

The plug-in supply 102 can also be connected to a DC source or load such that bi-directional charge transfer is inherent within a single set of boost modulation or buck modulation plug-in polarity switch states, depending on the plug-in supply voltage polarity. The plug-in supply versatility and bi-directional transfer could be applied to a variety of charge transfer operations including vehicle-to-vehicle charge transfer for roadside assistance of discharged vehicles equipped with this invention.

The methods provided, to the extent applicable, may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein, to the extent applicable, may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It is to be understood that the present invention is not limited to the embodiments described above, but encompasses any and all embodiments within the scope of the following claims. Additionally, although the features and elements of the present application are described in the example embodiments in particular combinations, each feature or element can be used alone (without the other features and elements of the example embodiments) or in various combinations with or without other features and elements of the present application.

What is claimed is:

1. A charge transfer system, comprising:
a plug-in power supply electrically connected between at least one of a first plurality of switch legs of a first inverter and at least one of a second plurality of switch legs of a second inverter, the plug-in power supply including a charge port; and
a controller operatively coupled to the first inverter and the second inverter, wherein the controller selectively modulates at least one of the first plurality of switch legs of the first inverter or at least one of the second plurality of switch legs of the second inverter such that electric current flows from an on-board vehicle power supply through at least one of a first plurality of stator windings of a first motor or at least one of a second plurality of stator windings of a second motor to the plug-in power supply for output at the charge port, and wherein the controller further selectively modulates the plurality of switch legs of the first inverter that are not directly connected to the plug-in power supply and the plurality of switch legs of the second inverter that are not directly connected to the plug-in power supply to reduce common mode noise between the plug-in supply and the on-board vehicle power supply.

2. The charge transfer system of claim 1, wherein the controller selectively modulates switch legs such that electric current flow alternates between the at least one of the first plurality of stator windings of the first motor to charge the on-board vehicle power supply during a first plug-in supply voltage polarity state and the at least one of the second plurality of stator windings of the second motor to charge the on-board vehicle power supply during a second plug-in supply voltage polarity state.

3. The charge transfer system of claim 2, wherein the selective modulation produces a unidirectional magnetizing current within the first motor and the second motor to produce a stationary zero torque rotor angle.

4. The charge transfer system of claim 1, wherein the controller interleaves the switch leg modulation to reduce current ripple on the plug-in supply.

5. The charge transfer system of claim 1, wherein selective modulating the at least one of the first plurality of switch legs of the first inverter and/or at least one of the second plurality of switch legs of the second inverter produces a unity power factor.

6. The charge transfer system of claim 1, wherein selective modulating the at least one of the first plurality of switch legs of the first inverter and/or at least one of the second plurality of switch legs of the second inverter occurs within a frequency range between 10-20 kilohertz.

7. The charge transfer system of claim 1, wherein the plug-in supply further comprises an electromagnetic interference filter.

8. The charge transfer system of claim 1, wherein the first motor and second motor are permanent magnet synchronous motors.

9. The charge transfer system of claim 1, wherein the first motor and second motor are AC induction motors.

10. The charge transfer system of claim 1, wherein the first motor and second motor are switched reluctance motors.

11. The charge transfer system of claim 1, wherein the first plurality of stator windings of the first motor and the second plurality of stator windings of the second motor are configured in a star connection.

12. The charge transfer system of claim 1, wherein the controller selectively modulates at least one of the first plurality of switch legs of the first inverter and at least one of the second plurality of switch legs of the second inverter.

* * * * *